US008897084B2

(12) United States Patent
Chen et al.

(10) Patent No.: US 8,897,084 B2
(45) Date of Patent: Nov. 25, 2014

(54) DYNAMIC DATA STROBE DETECTION

(75) Inventors: Hao Chen, San Ramon, CA (US);
Rakesh L. Notani, Sunnyvale, CA (US);
Sukalpa Biswas, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/227,974

(22) Filed: Sep. 8, 2011

(65) Prior Publication Data

US 2013/0064025 A1    Mar. 14, 2013

(51) Int. Cl.
*G11C 7/00* (2006.01)
(52) U.S. Cl.
USPC ... 365/193; 365/191; 365/233.1; 365/233.11; 365/236
(58) Field of Classification Search
USPC .............. 365/193, 194, 191, 233.1, 233.11, 365/233.12, 233.13, 233.14, 236
See application file for complete search history.

(56) References Cited

U.S. PATENT DOCUMENTS

| 6,453,402 | B1 | 9/2002 | Jeddeloh |
| 7,215,584 | B2 | 5/2007 | Butt et al. |
| 7,366,862 | B2 | 4/2008 | Nystuen et al. |
| 7,443,741 | B2 | 10/2008 | Butt et al. |
| 7,668,679 | B2 * | 2/2010 | Best ............... 702/106 |
| 8,086,813 | B2 * | 12/2011 | Gillingham et al. ......... 711/167 |
| 8,159,887 | B2 * | 4/2012 | Kizer et al. ................ 365/193 |
| 8,300,464 | B2 * | 10/2012 | Welker et al. .......... 365/185.09 |
| 8,493,801 | B2 * | 7/2013 | Dreps et al. ............... 365/193 |
| 2007/0058479 | A1 * | 3/2007 | Matsui .......................... 365/233 |
| 2008/0137789 | A1 * | 6/2008 | Cranford et al. .............. 375/354 |
| 2008/0276112 | A1 | 11/2008 | Matsui et al. |
| 2010/0007770 | A1 | 1/2010 | Koganezawa et al. |
| 2010/0039875 | A1 * | 2/2010 | Stott et al. ..................... 365/193 |
| 2011/0007586 | A1 | 1/2011 | Nakashima |
| 2011/0128060 | A1 * | 6/2011 | Ishino et al. ................... 327/262 |

FOREIGN PATENT DOCUMENTS

| JP | 2008-103013 | 5/2008 |
| JP | 2009-541868 | 11/2009 |
| JP | 2011-059762 | 3/2011 |
| TW | I279801 | 4/2007 |
| WO | 2005/072355 | 8/2005 |
| WO | 2008/000059 | 1/2008 |
| WO | 2008/063199 | 5/2008 |
| WO | 2011/098327 | 8/2011 |

OTHER PUBLICATIONS

JEDEC Standard: Low Power Double Data Rate 2 (LPDDR2), JESD209-2B (Revision of JESD209-2A, Oct. 2009), Feb. 2010, 238 pages.

(Continued)

*Primary Examiner* — Kretelia Graham
(74) *Attorney, Agent, or Firm* — Meyertons, Hood, Kivlin, Kowert & Goetzel, P.C.

(57) ABSTRACT

Techniques are disclosed relating to determining when a data strobe signal is valid for capturing data. In one embodiment, an apparatus is disclosed that includes a memory interface circuit configured to determine an initial time value for capturing data from a memory based on a data strobe signal. In some embodiments, the memory interface circuit may determine this initial time value by reading a known value from memory. In one embodiment, the memory interface circuit further configured to determine an adjusted time value for capturing the data, where the memory interface circuit is configured to determine the adjusted time value by using the initial time value to sample the data strobe signal.

17 Claims, 9 Drawing Sheets

(56) References Cited

OTHER PUBLICATIONS

International Search Report and Written Opinion in Application No. PCT/US12/53656 dated Nov. 16, 2012, 9 pages.

Extended European Search Report in Application No. 12183328.9 dated Jan. 7, 2013, 5 pages.

Office Action in Japanese Application No. 2012-213127 dated Jan. 8, 2014, 2 pages.

Office Action in Korean Patent Application No. 10-2012-99221 dated Sep. 30, 2013, 7 pages.

International Preliminary Report on Patentability in Application No. PCT/US2012/053656 mailed Mar. 12, 2014, 7 pages.

Notice of Last Preliminary Rejection in Korean Patent Application No. 10-2012-99221 mailed Apr. 30, 2014, 2 pages.

Final Office Action in Japanese Patent Application No. 2012-213127 mailed Jun. 25, 2014, 1 page.

Office Action in Taiwan Application No. 101132816 mailed Jul. 24, 2014, 5 pages.

\* cited by examiner

DYNAMIC DATA STROBE DETECTION

BACKGROUND

1. Technical Field

This disclosure relates generally to processors, and, more specifically, to interfacing processors with memory.

2. Description of the Related Art

When data is transmitted between a processor and memory, a data strobe signal (sometimes referred to as DQS) is provided with the data signal to indicate when voltages on the bus correspond to actual data values and to coordinate the capturing of the data values from the bus. In a write operation, the memory controller interface on the processor is responsible for generating the data strobe signal for the data being written to memory. In a read operation, memory generates the data strobe signal for the data being read.

The data strobe signal is typically transmitted over the same bidirectional bus line. As such, the DQS signal line may be permitted to float (i.e., operate in a tri-state) between performances of read and write operations. If the recipient attempts to capture data before the data strobe signal is valid, the tri-stated value of the signal line may cause data to be captured incorrectly. Still further, if the recipient starts capturing data after an initial cycle of the DQS signal, not all of the data will be captured.

SUMMARY

The present disclosure describes techniques for determining when a data strobe signal is valid for capturing data.

In one embodiment, a processor is disclosed that includes a memory interface circuit (e.g., a memory PHY) configured to facilitate the performance of write operations and read operations with memory. During a read operation, the memory interface circuit may capture data received from a memory bus by latching bits of the data based on a data strobe signal provided by memory. To reduce the chances of capturing invalid data, the memory interface circuit, in one embodiment, may perform a calibration (e.g., during initialization of the processor and memory, after exiting an auto refresh mode for memory, etc.) in which it sends a read request to memory for a known value. It then begins capturing bits and comparing them with a stored copy of the value to determine when the data on the bus becomes valid indicating that the data strobe signal is also valid. In one embodiment, the memory interface circuit may be configured to perform multiple read operations until it can determine when the data strobe value becomes valid (e.g., 3.5 clock cycles after sending a read request). In another embodiment, the memory interface circuit may send a single read request and capture bits of the data at a higher rate than the rate of the strobe signal (e.g., every quarter cycle of DQS) to determine when the signal becomes valid.

In some embodiments, the memory interface circuit may also be configured to perform a further calibration in which it samples the data strobe signal to determine when the data strobe signal is valid. The memory interface circuit may then adjust when it latching bits of the data based this determination. In one embodiment, the memory interface circuit is configured to determine when to sample the data strobe signal based on an initial time value determined by reading a known value from memory. In some embodiments, the memory interface circuit may periodically resample the data strobe signal to make minor adjusts as the timing of the strobe signal fluctuates due to changes in process, voltage, and temperature (PVT).

DETAILED DESCRIPTION OF EMBODIMENTS

Figure 1:
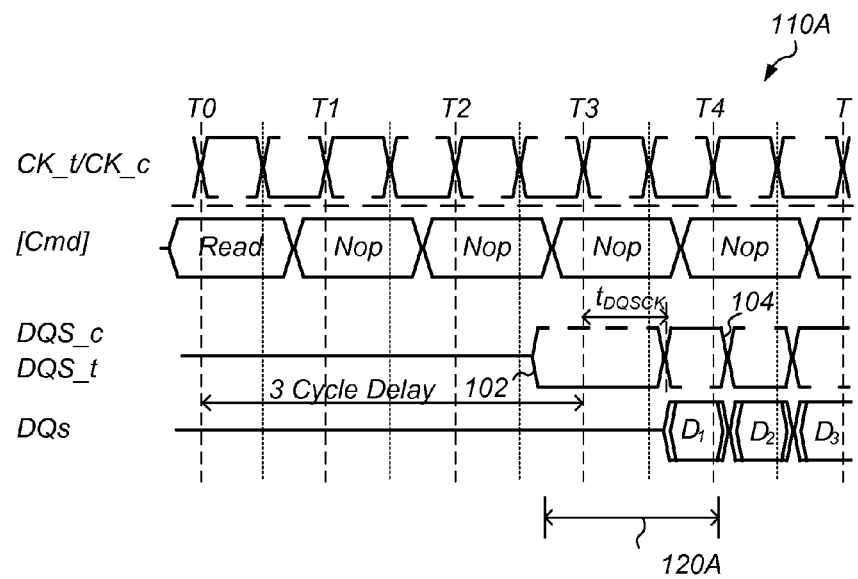
FIG. 1 is a pair of timing diagrams illustrating timing characteristics for two read operations.
Figure 1:
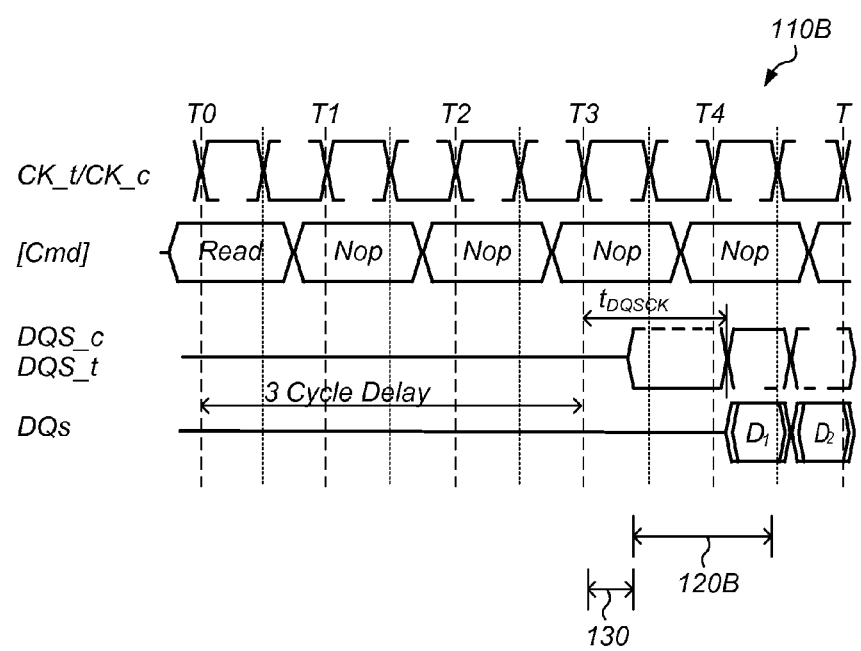

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Data Strobe Signal." This term has its ordinary and accepted meaning in the art, and includes a signal that is driven in conjunction with one or more data signals to indicate that valid data is being transmitted. A strobe signal typically has a similar phase and frequency as a data signal and may be used to capture data from the data signal.

* * *

Turning now to FIG. 1, a pair of timing diagrams 110A and 110B illustrating possible timing characteristics for two read operations is depicted. As shown, each diagram 110 includes a clock signal CK (represented by the differential signal pair CK_t and CK_c), a command signal [CMD], a data strobe signal DQS (represented by the differential signal pair DQS_c and DQS_t), and a data signal DQ. Clock signal CK may be used to coordinate the timing of various operations between an integrated circuit and memory. Command signal [CMD] may be generated by a memory physical interface circuit (PHY) to cause memory to perform various operations (e.g., row and column address strobes for a read, etc.). Data strobe signal DQS is a signal that oscillates when the data signal DQ has valid data (shown as bits $D_1$, $D_2$, $D_3$, etc.).

In both read operations, a memory PHY begins by sending a read command to memory via the CMD signal at time T0. The memory may then retrieve the data during the next one or more clock cycles and provide the requested data back to the memory PHY. When the memory begins to provide the data, memory drives DQS low and then oscillates DQS as the bits are driven across the bus. In diagram 110A, the memory drives DQS low after T2 and begins oscillating DQS after T3. In diagram 110B, the memory drives DQS low after T3 and begins oscillation after T4. As DQS oscillates, the memory PHY, in one embodiment, latches bits of DQ on the falling edges of DQS starting with falling edge 104.

To correctly capture all of the data in such an embodiment, the memory PHY must begin latching data during the first full fall of DQS (i.e., fall 104 from a logical one to a logical zero, as opposed to fall 102 from a floating value to a logical zero). If the first bit of data is latched at or before this fall (e.g., at 102A or before), the floating state of DQS may cause invalid bits to be latched. If the first bit is latched after 104A, the initial bit $D_1$ is not captured. In various embodiments, a memory PHY may control when data is captured by gating DQS (e.g., preventing it from driving a capturing DQ latch) until DQS becomes valid—e.g., the time after fall 102. Accordingly, in diagram 110A, the memory PHY must ungate DQS (i.e., provide it to the capturing latch) within period 120A to correctly capture all bits of data correctly.

Various memory standards may specify a delay period for when DQS will become valid after a read command has been issued to ensure that data is captured correctly. An example of this delay period is shown in diagrams 110A and 110B as a three CK cycle delay from the start of a read command at T0. While, in both diagrams 110A and 110B, DQS becomes valid after this three cycle period (note that the time between the ending of this delay and the start of DQS oscillation may be referred to as $t_{DQSCK}$), defining this period does not guarantee that DQS will be valid at the end of this period as shown in diagram 110B in which DQS is floating at T3. For example, in diagram 110A, if a memory PHY ungates DQS at T3, DQS is not floating and the memory PHY will correctly capture the data. However, in diagram 110B, DQS is floating during the period 130 after T3. If DQS is permitted to drive a capturing latch in the memory PHY during period 130, invalid data may be captured. If, however, DQS is ungated during period 120B, data should be captured correctly.

As will be described below, in various embodiments, an integrated circuit may use various techniques to determine when to begin using a data strobe signal to capture data. For example, such a circuit may use various techniques to determine a time value within both periods 120A and 120B and begin capturing data based on that time value.

Figure 2:
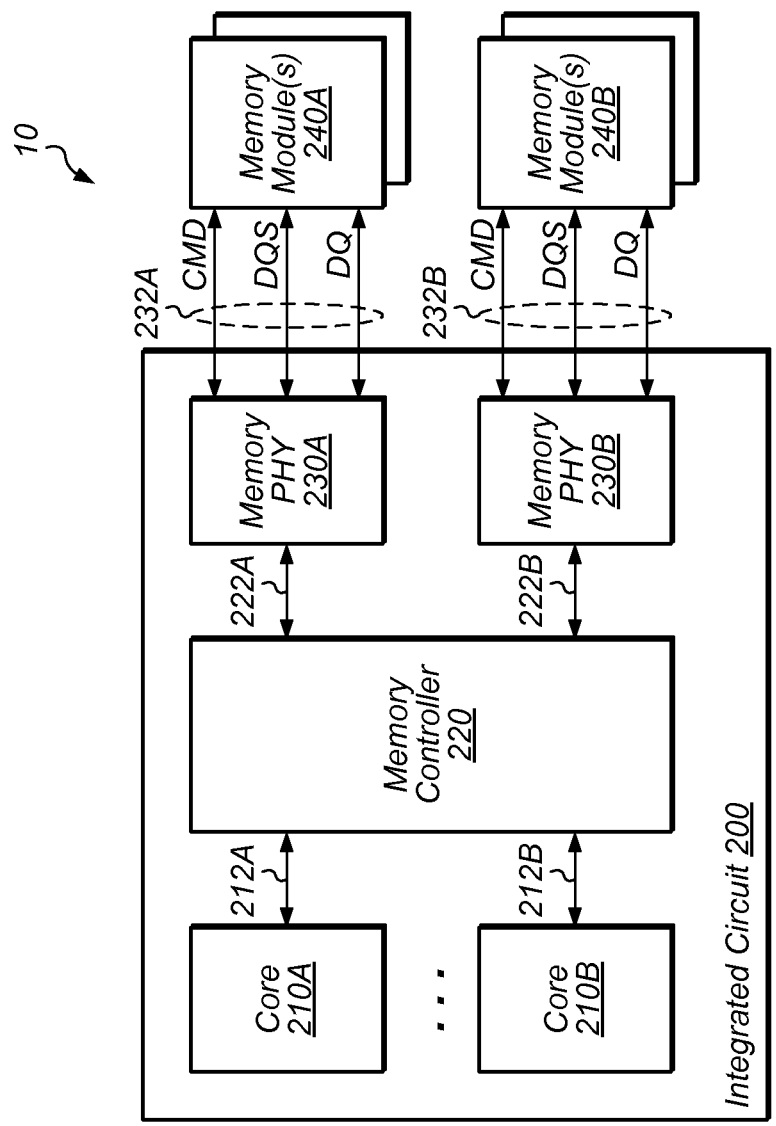
FIG. 2 is a block diagram illustrating one embodiment of an integrated circuit coupled to one or more memory modules.

Turning now to FIG. 2, a block diagram of a system 10 is depicted. In the illustrated embodiment, system 10 includes an integrated circuit (IC) 200 coupled to external memory modules 240A-240B. The integrated circuit 200 includes one or more processing cores 210A-210B, a memory controller 220, and one or more memory physical interface circuits (PHYs) 230A-230B. Memory controller 220 is coupled to cores 210A and 210B via respective interconnects 212A and 212B and to memory PHYs 230 via respective interconnects 222A and 222B. Memory PHYs are coupled to memory modules 240A and 240B via respective interconnects 232A and 232B.

Cores 210, in one embodiment, are configured to generate read and write requests for data. Cores 210 may implement any instruction set architecture, and may be configured to execute instructions defined in that instruction set architecture. Cores 210 may employ any microarchitecture, including scalar, superscalar, pipelined, superpipelined, out of order, in order, speculative, non-speculative, etc., or combinations thereof. Cores 210 may include circuitry, and optionally may implement microcoding techniques. Cores 210 may include one or more cache levels. One or more cores 210 may implement a graphics controller configured to render objects to be displayed into a frame buffer.

Memory controller 220, in one embodiment, is configured to process requests generated by cores 210 and to issue corresponding commands to memory modules 240 to cause performance of various memory operations. Memory controller 220 may also process requests from other sources such as various peripheral devices, networking devices, storage devices, I/O devices, etc. (such as those described in conjunction with FIG. 8). Memory controller 220 may include various structures for implementing a virtual memory such as translation structures, page walk units, etc. In one embodiment, memory controller 220 is configured to facilitate refreshing of memory modules 240 by issuing refresh commands to modules 240.

Memory PHYs 230, in one embodiment, are configured to handle the low-level physical interfacing of IC 200 with memory modules 240 to facilitate the exchange of data. For example, memory PHYs 230 may be responsible for the timing of the signals, for proper clocking to synchronous DRAM memory, etc. Memory PHYs 230 may be configured to lock to a clock supplied within the integrated circuit 200 and to generate a corresponding clock (e.g., clock signal CK described above) used by the memory modules 240. Memory PHYs 230 may be configured to relay commands from memory controller 220 to memory modules 240. Memory PHYs 230 also may be configured to receive commands from memory controller 220 and generate one or more corresponding signals (e.g, CMD, DQS, DQ, etc.) to memory modules 240.

Memory modules 240 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, LPDDR3, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 200 in a chip-on-chip configuration, a package-on-package configuration, or a multi-chip module configuration.

In various embodiments, memory PHYs 230 are configured to capture data DQ received from memory modules 240 based on a data strobe signal DQS. To ensure data is being captured when DQS is valid, PHYs 230, in one embodiment, are configured to perform a calibration process in which they determine when DQS becomes valid after sending a corresponding command to memory modules 240. As will be described below, in one embodiment, this calibration process may include reading a known value from memory and determining when the value can be captured correctly indicating that DQS is valid at that point. In some embodiments, this calibration process may further include periodically sampling DQS to more precisely determine the timing of DQS and detect any subsequent timing changes.

Figure 3:
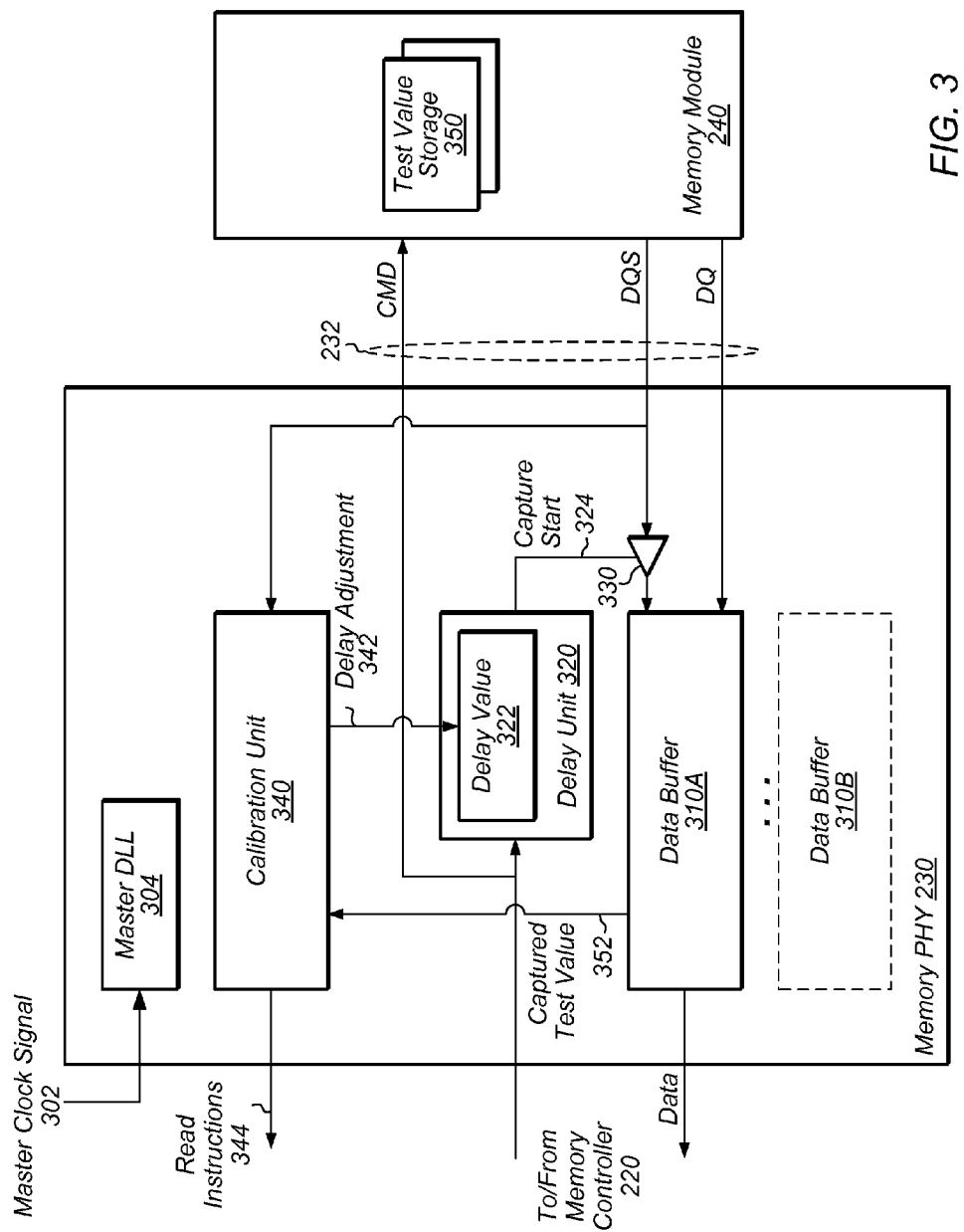
FIG. 3 is a block diagram illustrating one embodiment of a memory PHY coupled to a memory module.

Turning now to FIG. 3, one embodiment of a memory PHY 230 coupled to a memory module 240 is depicted. In the illustrated embodiment, memory PHY 230 includes a master delayed-lock loop (DLL) 304, one or more data buffers 310A and 310B, delay unit 320, gate 330, and calibration unit 340. Memory module 240 also includes test value storage 350.

Master DLL 304, in one embodiment, is configured to supply a received master clock signal 302 to various units in PHY 230 to coordinate performance of various operations. In one embodiment, master DLL 304 may further be configured to generate a clock signal CK for memory modules 240 based on signal 302. In some embodiments, the signal CK may have twice the rate of signal 302 if memory module 240 is a double data rate (DDR) memory.

Data Buffers 310, in one embodiment, are configured to capture and buffer data DQ received from memory module 240 until it can be provided to memory controller 220. In the various embodiments, data buffers 310 are configured to latch bits of data DQ based on the data strobe signal DQS (e.g., upon each falling (or rising) edge of DQS). As will be described below, calibration unit 340, in one embodiment, may capture bits from buffer 310 to determine timing characteristics of DQS. Data buffers 310 are described in further detail below in conjunction with FIGS. 5A and 5B.

Delay unit 320, in one embodiment, is configured to control when a data buffer 310 receives DQS by operating gate 330. In the illustrated embodiment, delay unit 320 is configured to assert a capture start signal 324 to open gate 330 after an appropriate delay 322 (e.g., 3.5 cycles of clock signal 302) has passed since a command CMD was sent to memory module 240. In one embodiment, delay unit 320 may be implemented using a delayed-lock loop. In various embodiments, the assertion of the capture start signal 324 is timed according to the DQS arrival (i.e., when DQS becomes valid). For example, in diagrams 110A and 110B described above, delay unit 320 may be configured to open gate 330 during the overlap of periods 120A and 120B to cause DQS to drive buffers 310 to capture data. As noted above, if capture start 324 is asserted after the first falling edge of DQS, buffer 310 may not correctly capture all DQ bits. Similarly, if capture start 324 is asserted when DQS is floating, buffers 310 may capture invalid data on false DQS edges.

Calibration unit 340, in one embodiment, is configured to determine when DQS likely to become valid and perform a delay adjustment 342 of delay value 322 so that delay unit 320 asserts capture start 330 during the appropriate period. In various embodiments, calibration unit 340 determines a delay value 322 for delay unit 320 by reading a test value from memory module 240 and analyzing the bits as buffer 310 captures them. When calibration unit 340 recognizes the captured test value 352 in the captured bit stream, calibration unit 340 can determine that DQS is valid during this period. Calibration unit 340 may then adjust the delay value 322 of delay unit 320 accordingly. In some embodiments, calibration unit 340 determines a delay value 322 by analyzing data captured from multiple read operations, where the data for each read operation was captured using a different respectively delay value 322. Calibration unit 340 may continue to test different delay values 322 until it determines a delay value 322 that produces a correct capture of the test value. In other embodiments, calibration unit 340 may alternatively analyze data from only a single read operation, where the data is captured at higher rate than DQS (e.g., every quarter cycle of DQS) to determine when the data is correct and DQS becomes valid. In some embodiments, the test value used to determine a delay value 322 is initially written to memory and subsequently read. In other embodiments, the test value is stored in a dedicated portion of the memory module 240—e.g., is permanently hardcoded.

Test value storage 350, in one embodiment, is a portion of module 240 dedicated to storing accessible test values. In some embodiments, storage 350 may include accessible registers, which return known test values. For example, in one embodiment in which memory module 240 implements an LPDDR standard, storage 350 includes mode registers (MR) 32 and 40, which return known data patterns in response to mode register read (MRR) commands. In one embodiment, calibration 340 may be configured to issue a read request directly to memory module 240 to cause it to return a test value from storage 350. In another embodiment, calibration 340 may instead cause memory controller 220 to issue a read command (e.g., via a read instruction 344), which memory PHY 230 then relays to memory module 240 for the test value.

In some embodiments, the delay value 322 determined by reading a known value may not be accurate enough to guarantee that data will consistently be captured correctly (or, taking the time to read a known value, in some instances, may not be viable option because of various timing constraints). In various embodiments, calibration unit 340 is configured to use a previously determined delay value 322 as an initial time value for sampling the DQS to determine when it becomes valid. In one embodiment, when calibration unit 340 is sampling DQS, it may attempt to identify the first full falling (or rising) clock edge of DQS and adjust delay value 322 accordingly. In some embodiments, calibration unit 340 may determine this adjusted delay value 322 during performance of a normal/functional read operation (i.e., a read operation that is not for a known test value).

Calibration unit 340 may determine when to read a known value or sample DQS based on various criteria. In one embodiment, calibration unit 340 may read a known value to perform a calibration (i.e., perform a "known-value calibration") when memory PHY 230 and memory modules 240 are initialized at startup (e.g., after a lock signal is asserted from master DLL 304, in one embodiment). (In one embodiment, memory controller 220 may cause calibration unit 340 to perform this initial calibration; calibration unit 340 may then determine when to perform subsequent calibrations on its own.) In some embodiments, calibration unit 340 may also perform a known-value calibration after memory module 340 exits an auto refresh mode, exits a lower power mode, after a predetermined period has passed, etc. In some embodiments, calibration unit 340 may sample DQS to perform a calibration (i.e., perform a "sampling calibration") after each performance of a known-value calibration (e.g., to determine a more accurate delay value 322). In some embodiments, calibration unit 340 may also periodically perform sampling calibrations (e.g., after a particular period has passed).

Figure 4:
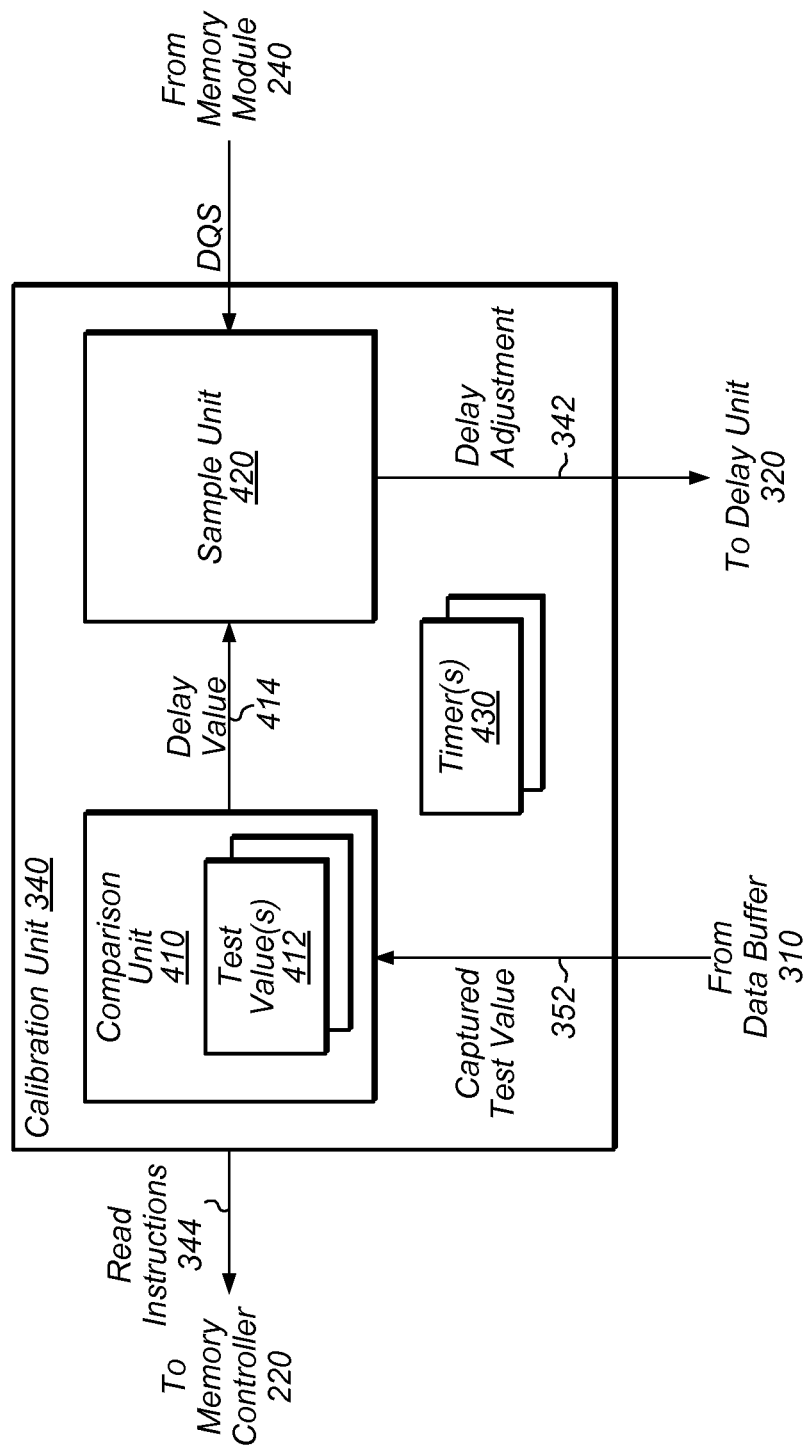
FIG. 4 is a block diagram illustrating one embodiment of a calibration unit in a memory PHY.

Turning now to FIG. 4, one embodiment of a calibration unit 340 is depicted. In the illustrated embodiment, calibration unit 340 includes a comparison unit 410, a sample unit 420, and one or more timers 430.

Comparison unit 410, in one embodiment, is configured to facilitate the performance of known-value calibrations. In the illustrated embodiment, comparison unit 410 compares the bits captured by buffer 310 with stored test values 412 (e.g., copies of the values in storage 350 such as the patterns returned by MR 32 and MR 40) to identify a captured test value 352. Comparison unit 410 may then determine a delay value 414 based on when it identifies the captured test value 352. In some embodiments, comparison unit 410 is configured to compare bits captured from multiple read operations to identify the value 352 and determine a delay value 414. In other embodiments, comparison unit 410 is configured to compare bits captured from only a single read operation to identify the value 352 and determine a delay value. In such an embodiment, bits may be captured at a higher rate than the rate of DQS (e.g., every quarter cycle of DQS) so multiple read operations are unnecessary. In the illustrated embodiment, comparison unit 410 provides value 414 to facilitate sampling of DQS. In another embodiment, calibration unit 340 may directly use value 414 as a delay value 322 to perform a delay adjustment 342.

Sampling unit 420, in one embodiment, is configured to facilitate performance of sampling calibrations. In various embodiments, sampling unit 420 is configured to sample the incoming DQS to check for a pre-determined pattern of DQS rising and falling edges to determine when DQS becomes valid. In one embodiment, sample unit 420 samples at a rate of, at least, every 1/16 cycle (e.g., 1/16 tCK phase shifted clocks may be generated by an oversampling DLL). As noted above, in one embodiment, sampling unit 420 is configured to sample DQS during a normal read operation; in another embodiment, sampling unit 420 may sample DQS during a known-value calibration. In the illustrated embodiment, calibration unit 340 performs an adjustment 342 of delay unit 320 based on the delay value determined by sampling unit 420 (in some embodiments, the delay value determined by sampling unit 420 may be more accurate than value 414 due to the higher sampling rate used by unit 420). As noted above, in various embodiments, the delay adjustment 342 may be performed to position the assertion of capture start 324 in the middle of the window in which DQS is likely to become valid.

Timers 430, in one embodiment, are used by calibration unit 340 to determine when to perform know-value and/or sampling calibrations. As noted above, in some embodiments, calibration unit 340 may be configured to perform a known-value calibration after an initialization (e.g., during system boot-up), after exiting DRAM self-refresh mode, etc., and may perform a sampling calibration immediately afterwards. In some embodiments, calibration unit 340 may further perform sampling calibrations periodically. In various embodiments, timers 430 may be used track when such calibrations were last performed. For example, each timer 430 may be loaded with a starting value on reset and re-loaded with the same starting value after a calibration. In one embodiment, when a timer 430 reaches a first threshold, calibration unit 340 may determine to perform a sampling calibration on the next available read. If the timer 430 reaches a second threshold before the read occurs, calibration unit 340 may instruct memory controller 220 to issue a read command and sample DQS during performance of that read operation. If calibration unit 340 is not able complete the sampling calibration (e.g., the next read does not occur soon enough or calibration unit 340 is unable to determine when DQS becomes valid) and a timer 430 reaches a third threshold, calibration unit 340 may then determine to perform a known-value calibration. In some embodiments, timers 430 may include respective timers 430 for each memory rank controlled by a memory PHY 230.

Figure 5A:
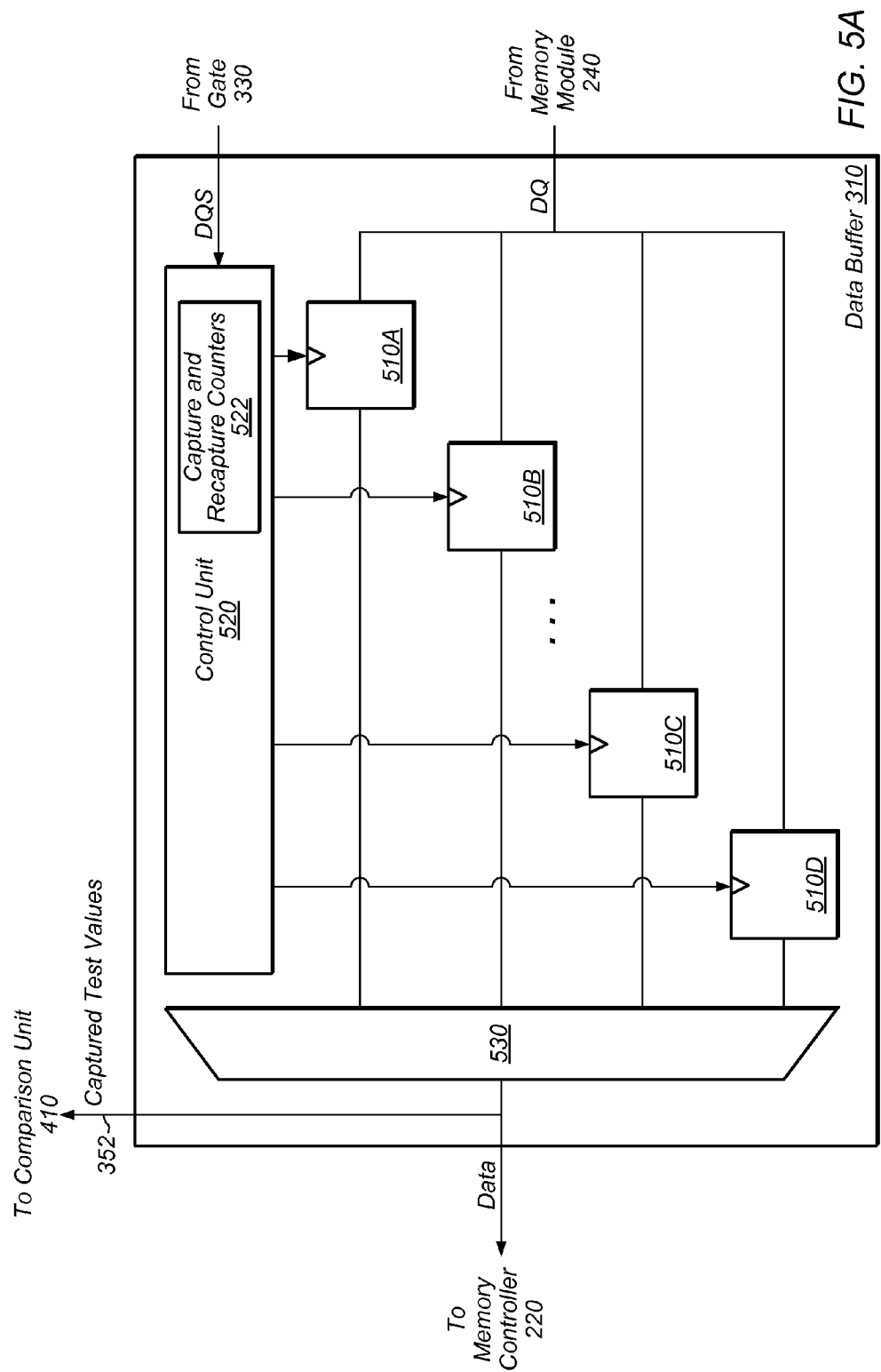
FIGS. 5A and 5B are block diagrams illustrating embodiments of a data buffer in a memory PHY.

Turning now to FIG. 5A, one embodiment of data buffer 310 is depicted. In the illustrated embodiment, buffer 310 is configured as a read-/write-pointer first-in-first-out (FIFO) buffer. As shown, buffer 310 includes latches 510A-D (e.g., DQ flip-flops), control unit 520, and multiplexer (MUX) 530.

In one embodiment, latches 510A-D are configured to store bits of data DQ received from memory module 240 until the bits can be provided to memory controller 220. During normal operation (i.e., when a delay value 322 is not being determined) in one embodiment, control unit 520 selects a latch for each received bit DQ and clocks the selected latch (i.e., causes the latch to capture and store the bit) based on DQS. Control unit 520 may then select the output of a latch 510 by using MUX 530 during a read from buffer 310. To track writes and reads, control unit 520 may maintain capture and recapture counters 522, which may indicate that last latches written to and read from (or the next latches to be written to and to be read from). Accordingly, in one embodiment, control logic 520 may increment a capture counter on the falling (or rising) edge of DQS when a bit is being latched, and may increment a recapture counter on the falling (or rising) edge of clock signal 302 when a bit is being read.

In one embodiment, when a delay value 322 is being determined, control unit 520 does not increment its capture and recapture counters 522, and instead, causes the same latch 510 to capture bits of the test value. As discussed above, in various embodiments, calibration unit 340 (e.g., specifically comparison unit 410 in the illustrated embodiment) may be configured to sample of the output of the latch 510 to perform a comparison the bits. As noted above, in some embodiments, calibration unit 340 is configured to sample the output at a higher rate than the rate of DQS (e.g., at least every quarter cycle of DQS); in other embodiments, unit 340 may sample a single bit during each cycle of DQS.

Figure 5B:
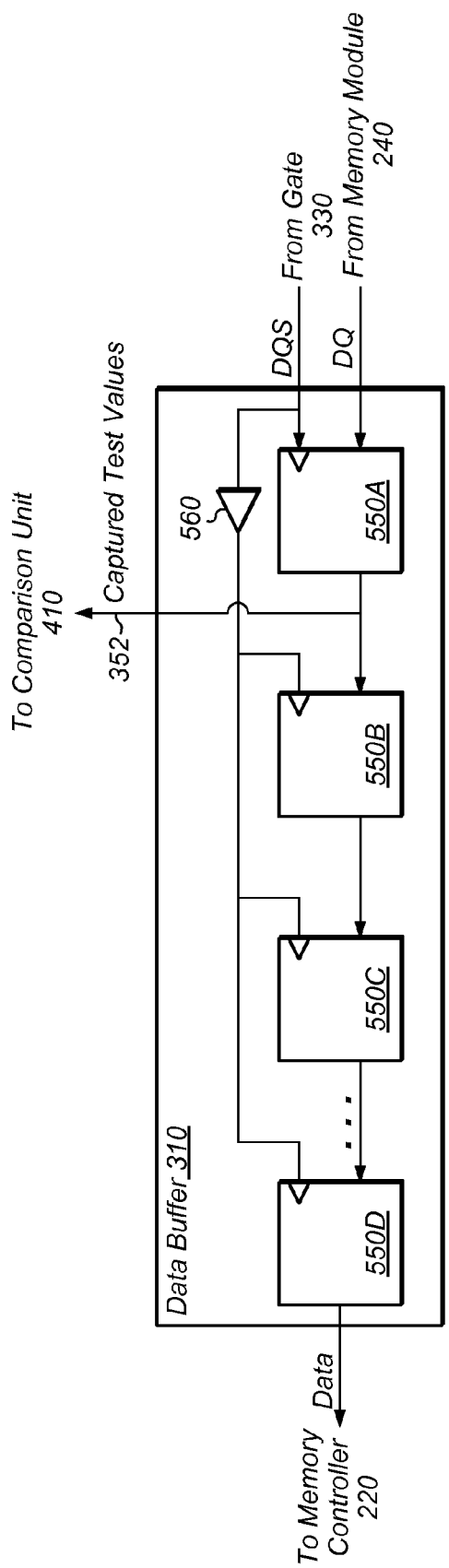

Turning now to FIG. 5B, another embodiment of data buffer 310 is depicted. In the illustrated embodiment, buffer 310 is configured as shift register FIFO buffer. As shown, buffer 310 includes latches 550A-D and a gate 560. During a normal read operation, latches 550, in one embodiment, are clocked by DQS as bits of data DQ are shift from one latch 550 to the next. In the illustrated embodiment, when a test value is being read, however, gate 560 is closed so that DQS drives only latch 550A and bits are not shifted into subsequent latches 550B-550D. Comparison unit 410 may then be configured to sample the output of only the initial latch 550A.

Figure 6:
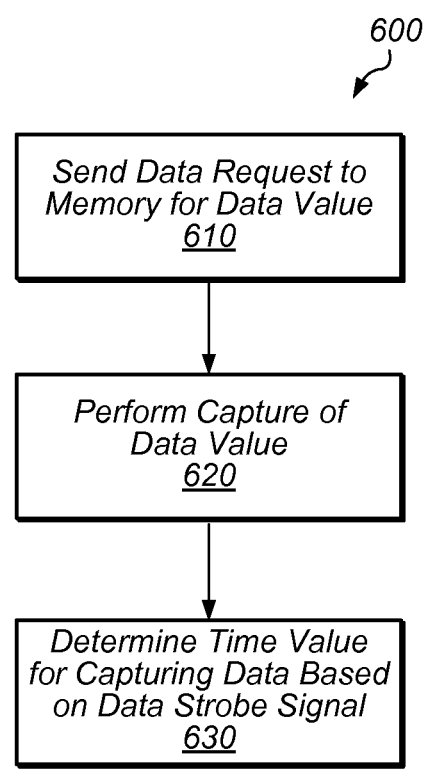
FIG. 6 is a flowchart illustrating one embodiment of a method for determining when a data strobe signal is valid.

Turning now to FIG. 6, a flow chart of a method 600 for determining when a data strobe signal is valid is depicted. Method 600 is one embodiment of a method that may be performed by a memory interface circuit such as memory PHY 230. In some embodiments, method 600 may be performed during an initialization of memory PHY 230 (e.g., during a boot IC 200), after exiting a refresh mode for memory, etc. In many instances, performance of method 600 may reduce the risks of capturing invalid data.

In step 610, memory PHY 230 sends a read request to memory (e.g., memory module 240) for a data value. In one embodiment, the data value is a test value stored in a dedicated portion of the memory (e.g., registers MR 32 or MR 40). In another embodiment, the data value was previously written to the memory. In one embodiment, memory PHY 230 may not generate (i.e., issue) the request, but instead cause a memory controller (e.g., memory controller 220) to issue the data request.

In step 620, memory PHY 230 performs a capture of the data value (e.g., from a bus 232). In one embodiment, memory PHY 230 compares the captured data value with a correct copy (e.g., one of test values 412) to determine whether the data value was captured correctly. In some embodiments, memory PHY 230 may perform a plurality of captures (e.g., at least four), during step 620, for the same read request such that each capture is associated with a respective time value (e.g., a different potential value of delay value 322).

In step 630, memory PHY 230 determines a time value for determining when to capture data based on a data strobe signal (e.g. DQS). In one embodiment, the determined time value is a value (e.g., delay value 322) representative of period between issuance of a read request to the memory and the data strobe signal being driven by the memory. In one embodiment, if multiple captures were performed in step 620 for different respective time values, memory PHY 230 may select one of the respective time values as the determined initial time value. Accordingly, in various embodiments, a time value may selected if it is in the middle of the window in which the data strobe signal is likely to become valid (e.g., within the overlap of periods 120A and 120B described above). In one embodiment, the selected value may then be used to subsequently capture data from memory (e.g., by controlling gate 330).

In some embodiments, method 600 may be performed in conjunction with method 700 described next.

Figure 7:
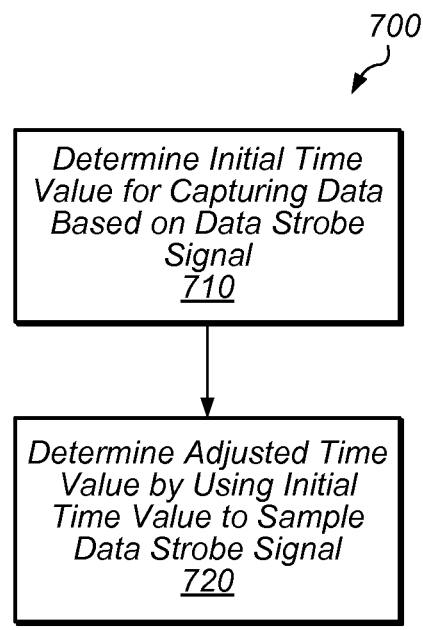
FIG. 7 is a flowchart illustrating another embodiment of a method for determining when a data strobe signal is valid.

Turning now to FIG. 7, a flow chart of another method 700 for determining when a data strobe signal is valid is depicted. Method 700 is one embodiment of method that may be performed by a memory interface circuit such as memory PHY 230. In many instances, performance of method 700 may reduce the risks of capturing invalid data.

In step 710, memory PHY 230 determines an initial time value for capturing data from a memory based on a data strobe signal. In some embodiments, step 710 includes performing method 600 described above.

In step 720, memory PHY 230 determines an adjusted time value by using the initial time value (determined in step 710 or during a pervious performance of step 720) to sample the data strobe signal. In one embodiment, memory PHY 230 performs multiple samples of the data strobe signal within a single cycle of the data strobe signal (e.g., every 1/16 of a cycle). In some embodiments, memory PHY 230 samples an output of a latch (e.g., latch 510A or 550A) within the buffer to perform the plurality of samples. As discussed above, in one embodiment, memory PHY 230 may sample the data strobe signal to check for a pre-determined pattern (e.g., of DQS rising and falling edges) indicating when the data strobe signal becomes valid. Memory PHY 230 may then use this adjusted time value to capture data received from memory.

In various embodiments, memory PHY 230 may continue to periodically perform step 720 to account for any adjustment of the data strobe signal. To determine when to re-perform step 720, memory PHY 230, in one embodiment, maintains a counter (e.g., one or more timers 430) indicating when a last redetection of the time (e.g., determined in pervious performance of step 720) was performed and performs another redetection upon expiration of the counter.

Exemplary Computer System

Figure 8:
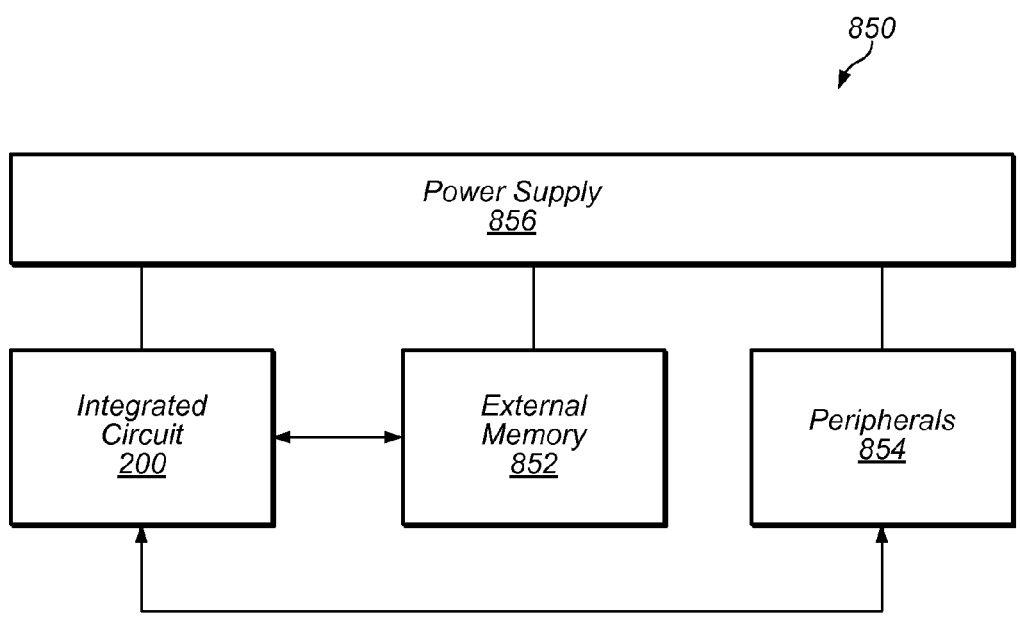
FIG. 8 is a block diagram of an exemplary system.

Turning next to FIG. 8 a block diagram of one embodiment of a system 850 (which, in some embodiments, may be used to implement system 10 described above) is shown. In the illustrated embodiment, the system 850 includes at least one instance of an integrated circuit 200 coupled to an external memory 852. The external memory 852 may form the main memory subsystem discussed above with regard to FIG. 2 (e.g. the external memory 852 may include the memory modules 240). The integrated circuit 200 is coupled to one or more peripherals 854 and the external memory 852. A power supply 856 is also provided which supplies the supply voltages to the integrated circuit 858 as well as one or more supply voltages to the memory 852 and/or the peripherals 854. In some embodiments, more than one instance of the integrated circuit 200 may be included (and more than one external memory 852 may be included as well).

The memory 852 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 200 in a chip-on-chip configuration, a package-on-package configuration, or a multi-chip module configuration.

The peripherals 854 may include any desired circuitry, depending on the type of system 850. For example, in one embodiment, the system 850 may be a mobile device (e.g. personal digital assistant (PDA), smart phone, etc.) and the peripherals 854 may include devices for various types of wireless communication, such as wifi, Bluetooth, cellular, global positioning system, etc. The peripherals 854 may also include additional storage, including RAM storage, solid state storage, or disk storage. The peripherals 854 may include user interface devices such as a display screen, including touch display screens or multitouch display screens, keyboard or other input devices, microphones, speakers, etc. In other embodiments, the system 850 may be any type of computing system (e.g. desktop personal computer, laptop, workstation, net top etc.).

\* \* \*

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a memory interface circuit configured to determine an initial time value for capturing data from a memory based on a data strobe signal, wherein the memory interface circuit is configured to determine the initial time value by:
issuing a single request for performance of a read operation in which a known value is to be retrieved from the memory;
performing a plurality of data captures at different respective time offsets during the read operation;
comparing the plurality of data captures with a copy of the known value; and
based on the comparing, selecting one of the different respective time offsets as the determined initial time value; and
wherein the memory interface circuit is configured to determine an adjusted time value for capturing the data, wherein the memory interface circuit is configured to determine the adjusted time value by using the initial time value to sample the data strobe signal, and the memory interface circuit is further configured to determine the adjusted time value without performance of a read operation in which a known value is retrieved from the memory.

2. The apparatus of claim 1, wherein the initial time value is a value representative of a period between issuance of a read request to the memory and the memory driving the data strobe signal.

3. The apparatus of claim 1, wherein the memory interface circuit is configured to:
perform a plurality of samples of the data strobe signal within a single cycle of the data strobe signal; and
use the adjusted time value to determine when to permit the data strobe signal to cause a capture of data.

4. The apparatus of claim 1, wherein the memory interface circuit is configured to periodically perform a determination of an adjusted time value for capturing the data.

5. An apparatus, comprising:
a memory interface circuit, wherein the memory interface circuit is configured to:
detect a time between issuing a data request to memory and receiving a corresponding data strobe signal from the memory;
use the detected time to validly capture data received from the memory;
redetect the time by periodically sampling the data strobe signal, wherein the memory interface circuit is configured to redetect the time by:
maintaining a counter indicating when a last redetection of the time was performed; and
performing a redetection upon expiration of the counter.

6. The apparatus of claim 5, wherein the memory interface circuit is configured to redetect the time during performance of a read operation corresponding to a subsequent read request.

7. The apparatus of claim 5, wherein the memory interface circuit is configured to use the detected time to determine a period in which the data strobe signal is to be sampled to redetect the time.

8. The apparatus of claim 5, wherein the data request is for a known value, and wherein detecting the time includes attempting to validly capture the known value.

9. The apparatus of claim 5, wherein the memory interface circuit is further configured to:
perform a first type of redetection in response to the counter satisfying a first threshold; and
perform a second type of redetection in response to the counter satisfying a second threshold.

10. The apparatus of claim 9, wherein the first type of redetection is based on a sampling of the data strobe signal during a subsequent read operation.

11. The apparatus of claim 9, wherein the second type of redetection includes issuing a request to the memory for a known value and capturing the known value from the memory.

12. A method, comprising:
a memory interface circuit detecting a time between issuing a data request to a memory and receiving a corresponding data strobe signal from the memory;
the memory interface circuit using the detected time to validly capture data from the memory; and
the memory interface circuit redetecting the time by periodically sampling the data strobe signal, wherein the redetecting the time includes:
maintaining a counter indicating when a last redetection of the time was performed; and
performing a redetection upon expiration of the counter.

13. The method of claim 12, wherein the memory interface circuit redetects the time during performance of a read operation corresponding to a subsequent read request.

14. The method of claim 12, wherein the memory interface circuit uses the detected time to determine a period in which the data strobe signal is to be sampled to redetect the time.

15. The method of claim 12, wherein the data request is for a known value, and wherein detecting the time includes attempting to validly capture the known value.

16. The method of claim 12, wherein the redetecting includes the memory interface circuit redetecting the time of sampling, in response to the counter satisfying a first threshold, the data strobe signal during a requested read option.

17. The method of claim 15, wherein the redetecting includes the memory interface circuit redetecting the time of issuing, in response to the counter satisfying a second threshold, an instruction to read a known value from the memory.

* * * * *

UNITED STATES PATENT AND TRADEMARK OFFICE
CERTIFICATE OF CORRECTION

PATENT NO.        : 8,897,084 B2                          Page 1 of 1
APPLICATION NO.   : 13/227974
DATED             : November 25, 2014
INVENTOR(S)       : Hao Chen et al.

It is certified that error appears in the above-identified patent and that said Letters Patent is hereby corrected as shown below:

In the Claims:

Claim 17, Column 12, Line 57, please delete "of claim 15" and substitute -- of claim 16 --

Signed and Sealed this
Twenty-sixth Day of May, 2015

Michelle K. Lee
*Director of the United States Patent and Trademark Office*